(12) United States Patent
Bono et al.

(10) Patent No.: US 9,965,201 B1
(45) Date of Patent: May 8, 2018

(54) COALESCING FILE SYSTEM FREE SPACE TO PROMOTE FULL-STRIPE WRITES

(71) Applicant: EMC Corporation, Hopkinton, MA (US)

(72) Inventors: Jean-Pierre Bono, Westborough, MA (US); Philippe Armangau, Acton, MA (US); Alexander Mathews, Jamesburg, NJ (US); Rohit Chawla, Scotch Plains, NJ (US); Ahsan Rashid, Edison, NJ (US)

(73) Assignee: EMC IP Holding Company LLC, Hopkinton, MA (US)

( * ) Notice: Subject to any disclaimer, the term of this patent is extended or adjusted under 35 U.S.C. 154(b) by 313 days.

(21) Appl. No.: 14/674,566

(22) Filed: Mar. 31, 2015

(51) Int. Cl.
*G06F 3/06* (2006.01)

(52) U.S. Cl.
CPC ............ *G06F 3/0619* (2013.01); *G06F 3/064* (2013.01); *G06F 3/0665* (2013.01); *G06F 3/0689* (2013.01)

(58) Field of Classification Search
CPC ...... G06F 3/0619; G06F 3/064; G06F 3/0665; G06F 3/0689
See application file for complete search history.

(56) References Cited

U.S. PATENT DOCUMENTS

| | | | |
|---|---|---|---|
| 7,631,155 B1 | 12/2009 | Bono et al. | |
| 8,661,068 B1 | 2/2014 | Seibel et al. | |
| 9,069,682 B1 | 6/2015 | Veeraswamy | |
| 9,122,589 B1 | 9/2015 | Bono et al. | |
| 9,146,928 B1 | 9/2015 | Noveck | |
| 9,280,578 B1 | 3/2016 | Zhou et al. | |
| 9,286,007 B1 | 3/2016 | Bono | |
| 9,400,741 B1 | 7/2016 | Bono et al. | |
| 2002/0116569 A1* | 8/2002 | Kim | G06F 12/0246 711/103 |
| 2013/0111115 A1* | 5/2013 | Iliadis | G06F 12/02 711/103 |
| 2016/0077746 A1* | 3/2016 | Muth | G06F 3/0608 711/159 |
| 2016/0110121 A1* | 4/2016 | Singh | G06F 3/0613 711/156 |

* cited by examiner

*Primary Examiner* — Reginald G Bragdon
*Assistant Examiner* — Edward Wang
(74) *Attorney, Agent, or Firm* — BainwoodHuang

(57) ABSTRACT

An improved technique for managing data storage includes relocating allocated blocks within a range of a physical address space of a file system to free the allocated blocks. The range has a length equal to a length of one or more full stripes of a RAID group that stores content of the file system. In response to receiving data to be written to the file system, the file system arranges the data in the range of contiguous blocks and performs one or more full-stripe writes to write the data to the RAID group.

20 Claims, 9 Drawing Sheets

US 9,965,201 B1

COALESCING FILE SYSTEM FREE SPACE TO PROMOTE FULL-STRIPE WRITES

BACKGROUND

Data storage systems are arrangements of hardware and software that typically include multiple storage processors coupled to arrays of non-volatile storage devices, such as magnetic disk drives, electronic flash drives, and/or optical drives, for example. The storage processors service storage requests that arrive from host machines ("hosts") and that specify files or other data elements to be written, read, created, or deleted, for example. The storage processors run software that manages incoming storage requests and performs various data processing tasks to organize and secure data stored on the non-volatile storage devices.

Data storage systems commonly employ RAID technology to protect the data they store. RAID is an acronym for "Redundant Array of Independent (or sometimes, "Inexpensive") Disks." A data storage system may include multiple RAID groups, where each RAID group is formed from one or more disk drives. In some arrangements, a RAID group divides its participating disk drives into segments and forms multiple RAID stripes across corresponding segments on different drives. One or more segments in a RAID stripe may be designated for storing parity information. In the event of a disk failure that damages one of the segments in the RAID stripe, the RAID group can reconstruct the damaged segment using the data and parity information from the remaining segments. It is common practice to arrange segments in RAID stripes so as to promote fast disk access. For example, a RAID group may interleave access to segments on different disk drives to improve overall performance.

SUMMARY

A technique has recently been proposed for improving disk utilization by mapping data directed to diverse logical addresses of a file to contiguous physical addresses, so as to provide ranges of contiguous data having lengths equal to that of one or more full stripes of an underlying RAID group. With this technique, a data storage system can write contiguous data to the RAID group using efficient, full-stripe writes. The proposed technique relies on a file system having available contiguous ranges of free space that are ready to receive full stripes' worth of data. Unfortunately, such contiguous ranges of free space can quickly run out. For example, a file system may allocate space at diverse physical addresses, e.g. to avoid hot spots and/or to promote contiguous writes of other data. Such allocation schemes tend to quickly consume full-stripe-size ranges of space in the file system. Once the file system runs out of ranges of contiguous free space, the file system may fall back on conventional allocation schemes, which do not optimize for full-stripe writes and thus suffer from lower efficiency. What is needed is a way of creating free space to enable a data storage system to more fully realize the benefits of full-stripe writing.

In contrast with prior approaches, an improved technique for managing data storage includes relocating allocated blocks within a range of a physical address space of a file system to free the allocated blocks. The range has a length equal to a length of one or more full stripes of a RAID group that stores content of the file system. In response to receiving data to be written to the file system, the file system arranges the data in the range of contiguous blocks and performs one or more full-stripe writes to write the data to the RAID group.

In an example, the improved technique can create free space in a file system as needed and as resources allow to support full-stripe writes of newly arriving data. The potential of full-stripe writing for improving disk utilization can thus be more fully realized.

Certain embodiments are directed to a method of managing data storage in a data storage system. The method includes performing a block relocation operation on a range of contiguous blocks in a physical address space of a file system to free a set of allocated blocks within the range of contiguous blocks. The range of contiguous blocks has a length equal to that of a set of full stripes of a RAID group that stores content of the file system. In response to the data storage system receiving a set of data to be written to the file system, the method further includes arranging the set of data in the range of contiguous blocks and performing a set of full-stripe writes to write the set of data arranged in the range of contiguous blocks to the RAID group.

Other embodiments are directed to a data storage system constructed and arranged to perform a method of managing data storage, such as the method described above. Still other embodiments are directed to a computer program product. The computer program product stores instructions which, when executed on one or more processing units of a data storage system, cause the processing units to perform a method of managing data storage, such as the method described above. Some embodiments involve activity that is performed at a single location, while other embodiments involve activity that is distributed over multiple locations, e.g., over a network.

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same or similar parts throughout the different views. The drawings are not necessarily to scale. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for managing data storage includes relocating allocated blocks in a range of a physical address space of a file system to free the allocated blocks and to create space for performing full-stripe writes. The ability of a data storage system to create contiguous free space for performing full-stripe writes allows the data storage system to improve its efficiency and disk utilization.

This application is presented in sections to assist the reader:
  Section I presents an example environment in which embodiments of the invention can be practiced, as well as an example set of operations in which embodiments of the invention may be usefully applied; and
  Section II builds upon Section I and presents example embodiments for creating free space in a file system to enable the performance of full-stripe writes.
Section I: Example Environment and Operations This section describes an example environment and technique for managing data storage in a set of RAID groups. The technique includes receiving IO requests specifying data to be written to different logical addresses and mapping the specified data to contiguous physical addresses, so as to produce contiguously-mapped data having a length equal to that of a full stripe of a RAID group. More information about the environment and technique described in this section may be found in U.S. patent application Ser. No. 14/576,952, filed Dec. 14, 2014, the contents and teachings of which are incorporated by reference in their entirety as if set forth explicitly herein.

Figure 1:
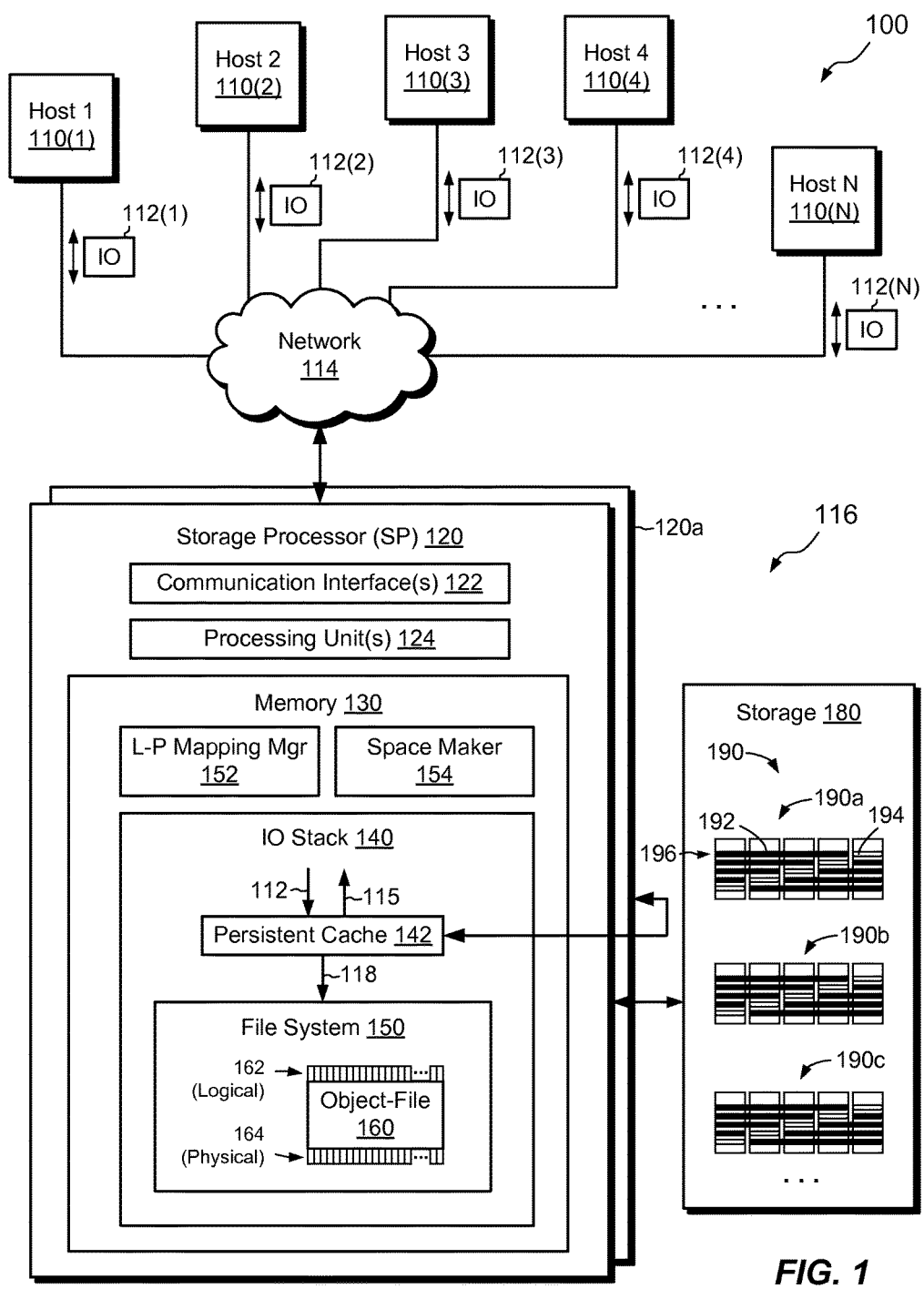
FIG. 1 is a block diagram showing an example environment in which techniques hereof may be practiced.

FIG. 1 shows an example environment 100 in which embodiments of the improved technique hereof can be practiced. Here, multiple host computing devices ("hosts"), shown as devices 110(1) through 110(N), access a data storage system 116 over a network 114. The data storage system 116 includes a storage processor, or "SP," 120 and storage 180. The data storage system 116 may include multiple SPs like the SP 120 (e.g., a second SP, 120a). In an example, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs, including a single SP, may be provided and the SP 120 can be any type of computing device capable of processing host IOs.

In an example, the storage 180 takes the form of RAID groups 190a, 190b, and 190c (collectively, 190), where each RAID group is composed of multiple disk drives. The disk drives may include magnetic disk drives, electronic flash drives, optical drives, and/or other types of drives. In a typical example, each of the RAID groups 190 includes disk drives of a common type that provide similar performance. Each of the RAID groups 190 is seen to include five disk drives. Five stripes are shown in each RAID group, although it should be understood that each RAID group may include hundreds or thousands or more stripes. Each stripe 196 is shown as a horizontal band across all of the disk drives in a RAID group and includes four data segments 192 and a single parity segment 194. Segments may be of any suitable size, such as 64 KB, for example, such that each stripe has a length of 256 KB (parity is generally not counted when measuring stripe length). Other RAID configurations may be used, including those with a different number of disk drives per RAID group, different numbers and/or sizes of data and/or parity segments, and/or different numbers of stripes. Any number of RAID groups may be provided, including a single RAID group. The example shown is thus intended to be merely illustrative.

The network 114 can be any type of network or combination of networks, such as a storage area network (SAN), a local area network (LAN), a wide area network (WAN), the Internet, and/or some other type of network or combination of networks, for example. The hosts 110(1-N) may connect to the SP 120 using various technologies, such as Fibre Channel, iSCSI, NFS, SMB 3.0, and CIFS, for example. Any number of hosts 110(1-N) may be provided, using any of the above protocols, some subset thereof, or other protocols besides those shown. As is known, Fibre Channel and iSCSI are block-based protocols, whereas NFS, SMB 3.0, and CIFS are file-based protocols. The SP 120 is configured to receive IO requests 112(1-N) according to both block-based and file-based protocols and to respond to such IO requests 112(1-N) by reading or writing the storage 180.

The SP 120 is seen to include one or more communication interfaces 122, a set of processing units 124, and memory 130. The communication interfaces 122 include, for example, SCSI target adapters and network interface adapters for converting electronic and/or optical signals received over the network 114 to electronic form for use by the SP 120. The set of processing units 124 includes one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons.

As further shown in FIG. 1, the memory 130 includes (i.e., realizes by operation of programming code) an IO stack 140, an L-P (Logical-to-Physical) mapping manager 152, and a space maker 154. The IO stack 140 provides an execution path for host IOs (e.g., IO requests 112(1-N)). The L-P mapping manager 152 provides mapping services for data objects to promote full-stripe writes. The space maker 154 performs block relocation to create contiguous free space for supporting full-stripe writes. The nature and operation of the space maker 154 are described more fully in Section II.

The IO stack 140 is seen to include a persistent cache 142 and a file system 150. The file system 150 realizes a data object in the form of an object-file 160. The data object may itself take the form of a LUN (Logical Unit Number), a host file system, a VVol (virtual volume, available from VMware, Inc. of Palo Alto, Calif.), or some other data object, for example. Mapping within the IO stack 140 converts IO requests to corresponding reads and writes of the underlying object-file 160. The object-file 160 has a logical address space 162 and a set of associated physical addresses 164. In an example, the logical address space 162 is a monotonic range of logical offsets into the object-file 160, e.g., as tracked by an inode structure of the object-file 160 in the file system 150. The physical addresses 164 are particular addresses of blocks that the file system 150 uses to store data of the object-file 160. In an example, the physical addresses 164 are identified by file system block number (FSBN).

In an example, the persistent cache 142 is implemented in DRAM (Dynamic Random Access Memory). The DRAM is mirrored to DRAM on at least one other SP (e.g., on SP 120a), and the DRAM on both SPs is backed up by battery. The contents of the cache 142 thus persist on at least two SPs, and remain intact even in the event of a power loss. The persistent cache 142 thus provides the speed characteristics of DRAM while also providing persistence not normally found with DRAM.

In example operation, the hosts 110(1-N) issue IO requests 112(1-N) to the data storage system 116. The SP 120 receives the IO requests 112(1-N) at the communication interfaces 122 and passes the IO requests to the IO stack 140 for further processing. The IO requests 112(1-N) include IO requests 112 specifying data to be written to the data object. For each IO request 112, the persistent cache 142 stores the data specified in the IO request 112. The persistent cache 142 also provides an acknowledgment 115 once the data specified in the IO request 112 have been securely stored (e.g., saved to battery-backed DRAM on the SP 120 and successfully mirrored to battery-backed DRAM on SP 120a). The acknowledgement 115, which indicates successful completion of the IO request 112, propagates back to the originating host, e.g., back to one of the hosts 110(1) to 110(N). The above process may be repeated for additional IO requests 112 specifying additional data to be written to various locations of the data object. The persistent cache 142 accumulates the data specified in these IO requests 112, e.g., in the order received, and provides an acknowledgement 115 in response to each one.

The IO requests 112 specify not only data to be written but also the locations of the data to be written relative to the data object. For example, if the data object is a LUN, the IO request 112 may specify the location of the data as an offset into the LUN. If the data object is a host file system, the IO request 112 may specify the location of the data by file name and an offset into the named file. As will be described, the IO stack 140 maps these various location indicators to a set of logical offsets within the object-file 160. The file system 150 further maps these logical offsets to physical addresses (among the addresses 164) of blocks at specified FSBNs. In some cases, the data to be written are directed to blocks that have already been allocated and mapped by the file system 150, such that the data writes prescribe overwrites of existing blocks. In other cases, the data to be written do not yet have any associated physical storage, such that the file system must allocate new blocks to the object-file 160 to store the data.

At some point in the course of accumulating data from IO requests 112, and out of band with the processing of particular IO requests 112, the persistent cache 142 performs a flushing operation 118 to send the accumulated data, or portions thereof, to the file system 150 for organizing and incorporating the data into the storage 180. The file system 150, upon receiving the flushed data, invokes the L-P mapping manager 152. The L-P mapping manager 152 makes a determination as to whether to organize file mapping in such a way as to promote full-stripe writes. The L-P mapping manager 152 may make its determination selectively based on multiple factors, such as the amount of available contiguous free space in the RAID groups 190 and on a metadata processing workload currently being handled by the file system 150. If the L-P mapping manager 152 determines that no remapping should be performed, e.g., based on current circumstances, then the file system 150 processes the data flushed from the persistent cache 142 in its usual way, e.g., without regard to full-stripe writes.

However, if the L-P mapping manager 152 determines that mapping should be performed to promote full-stripe writes, then the L-P mapping manager 152 directs the file system 150 to perform data and metadata operations to arrange the data being flushed from the persistent cache 142 in contiguous physical addresses. For example, the L-P mapping manager 152 may direct the file system 150 to allocate a range of contiguous free blocks (i.e., a "window") to the file system 150, where the range of contiguous free blocks has a length equal to that of a full-stripe (e.g., a length of 256 KB, given the example numbers above). In the case of overwrites, the L-P mapping manager 152 may direct the file system 150 to update block pointers for the object-file 160 so that the logical addresses of the flushed data point to the physical addresses of the newly allocated contiguous range of blocks, rather than pointing to their original locations, which may be randomly distributed throughout the physical address space. Blocks pointed away from may be freed and made available for other use. The L-P mapping manager 152 then directs the file system 150 to write the flushed data to the newly allocated blocks in accordance with the updated mapping. Lower levels of the IO stack 140 then effect a write operation on an available full stripe of a RAID group (one of 190a, 190b, and 190c), e.g., with data written to the stripe in the same order in which they are mapped in the physical addresses in the file system 150. The L-P mapping manager 152 thus converts data writes directed to arbitrary logical addresses in the object-file 160 into contiguous writes of full-stripe size, which lower levels of the IO stack 140 apply to RAID groups 190 as full-stripe writes.

It should be understood that the L-P mapping manager 152 may coalesce data writes covering lengths greater than one full stripe. For example, the L-P mapping manager 152 may aggregate data being flushed from the persistent cache 142 into windows having lengths equal to any integer number of full stripes. In such cases, lower levels of the IO stack 140 can perform multiple full-stripe writes on the remapped data.

The data storage system 116 may also invoke the L-P mapping manager 152 when performing allocating writes, i.e., writes that enlarge the logical address space 162 of the object-file 160. Such writes may cause the file system 150 to allocate new blocks for storing additional content and to add new block pointers to point to the newly allocated blocks. In accordance with improvements hereof, the IO stack 140 invokes the L-P mapping manager 152 in these instances as well. For example, the L-P mapping manager 152, when active, directs the file system 150 to allocate a range of blocks at contiguous physical addresses having length equal to that of a full stripe, or an integer number of full stripes. Lower levels of the IO stack 140 then operate to effect full-stripe writes of the new data on the RAID groups 190.

Of course, data flushed from the persistent cache 142 may include a mixture of data to be overwritten and data that require new blocks to be allocated. In these examples, the L-P mapping manager 152 behaves as described above in the respective cases. When the L-P mapping manager 152 determines that it should act to promote full-stripe writes, the L-P mapping manager 152 may direct the file system 150 to allocate new blocks over a range (window) equal to an integer number of full stripes and to remap and map as required for overwrites and for allocating writes, respectively.

Figure 2:
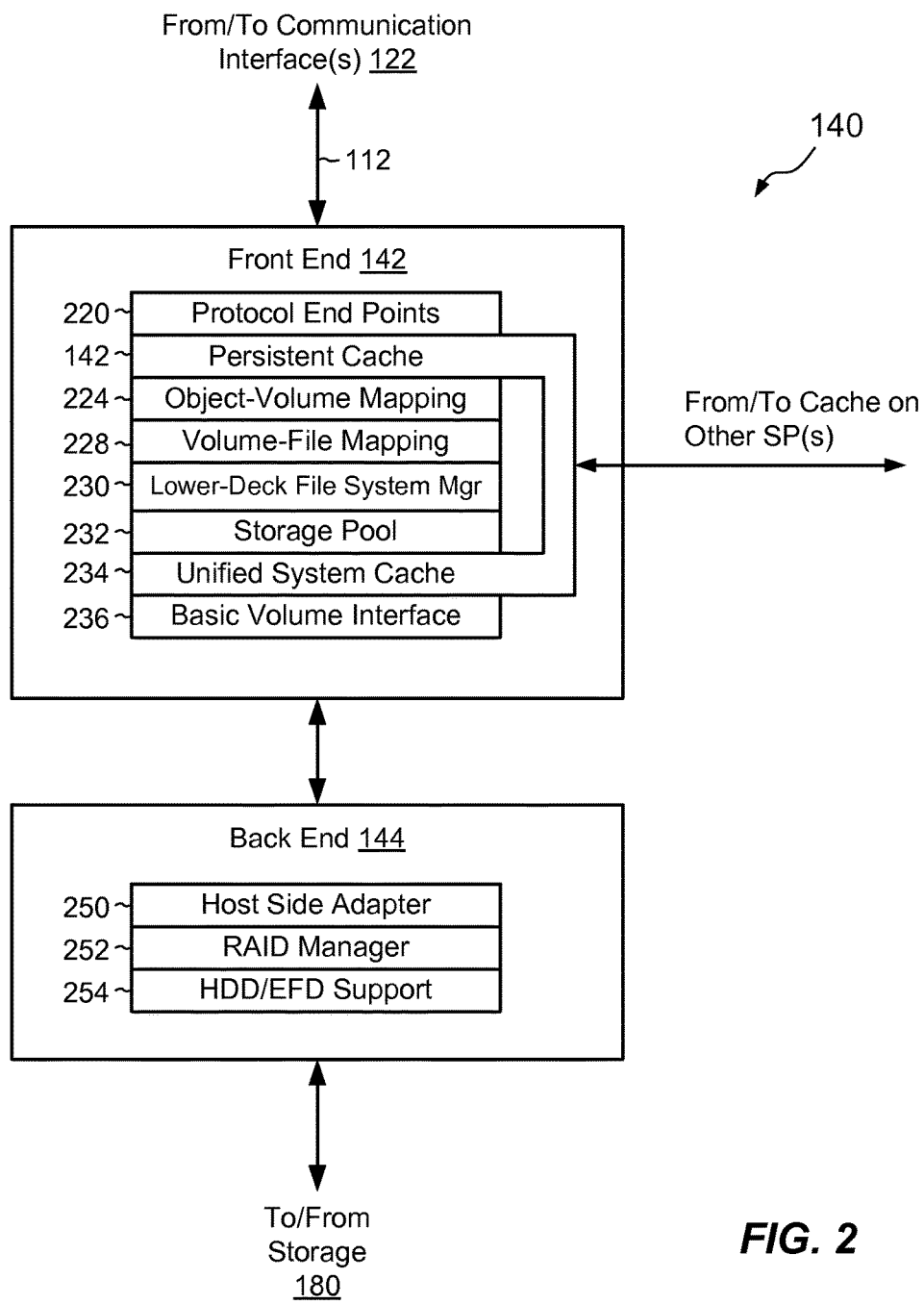
FIG. 2 is a block diagram showing an example IO stack of a storage processor of FIG. 1 in additional detail.

FIG. 2 shows the example IO stack 140 of FIG. 1 in additional detail. Here, the IO stack 140 is seen to include a front end 142 and a back end 144. The front end 142 and back end 144 may be operated together on the same SP, as they are in FIG. 1, or may be operated on different SPs, e.g., in a modular arrangement. Further, the front end 142 may be connected directly to a separate block-based array, e.g., in a gateway arrangement, with back-end functionality provided by the block-based array.

The front end 142 is seen to include protocol end points 220, the persistent cache 142, an object-volume mapping layer 224, a volume-file mapping 228, a lower-deck (internal) file system manager 230, a storage pool 232, a unified system cache 234, and a basic volume interface 236. For reasons that will become apparent, the persistent cache 142 is shown as an extension of the unified system cache 234.

The back end 144 is seen to include a host side adapter 250, a RAID manager 252, and hard disk drive/electronic flash drive support 254. Although IO requests 112 enter the IO stack 140 from the top and propagate down (from the perspective of FIG. 2), the components of the IO stack 140 are described herein from the bottom to the top to promote ease of understanding.

At the back end 144, the hard disk drive/electronic flash drive support 254 includes drivers that perform the actual reading from and writing to the magnetic disk drives, electronic flash drives, etc., in the storage 180. The RAID manager 252 arranges the storage media into RAID groups 190 and provides access to the RAID groups 190 using RAID protocols. The host side adapter 250 provides an interface to the front end 142, for implementations in which the front end 142 and back end 144 run on different machines or SPs. When the front end 142 and back end 144 are co-located on the same SP, as they are in FIG. 1, the host side adapter 250 may be omitted or disabled.

Continuing to the front end 142, the basic volume interface 236 provides an interface to the back end 144 for instances in which the front end 142 and back end 144 are run on different machines or SPs. The basic volume interface 236 may be disabled in the arrangement shown in FIG. 1.

The unified system cache 234 provides caching services for underlying RAID groups 190. In an example, the IO stack 140 provides a LUN-based interface for each RAID group 190 to enable the RAID group to be accessed using LUN semantics. RAID groups 190 accessed through these interfaces have been referred to as "classic LUNs" or "Flare LUNs." In an example, portions of the unified system cache 234 are organized by Flare LUN, e.g., with the IO stack 140 reading and writing to these portions of the unified system cache 234 by specifying a particular Flare LUN and an offset range.

The storage pool 232 organizes elements of the storage 180 in the form of slices. A "slice" is an increment of storage space, such as 256 MB or 1 GB in size, which is composed from a portion of a Flare LUN (i.e., of a RAID group). The pool 232 may allocate slices to lower-deck file systems to support the storage of data objects. The pool 232 may also deallocate slices from lower-deck file systems if storage provided by the slices is no longer required.

The lower-deck file system manager 230 builds and manages internal, lower-deck file systems (like the file system 150) upon slices served by the storage pool 232. Lower-deck file systems can realize both block-based objects and file-based objects in the form of files (container files). The data storage system 116 may include any number of lower-deck file systems, and each lower-deck file system may include any number of files. In a typical arrangement, a different lower-deck file system is provided for each data object to be stored. Each lower-deck file system includes one file that realizes the data object itself and, in some instances, other files that realize snaps of the file that stores the data object. Some implementations allow for storing additional files. Each of the lower-deck file systems has an inode table. The inode table provides a different inode for each file stored in the respective lower-deck file system. Each inode stores properties of a respective file, such as its ownership, and includes and/or points to block pointers that map logical addresses of the file to physical addresses of blocks that store the file's data. A "block" is the smallest allocatable unit of storage, which may be, for example, 8 KB in size. Blocks may be of sizes different from 8 KB, however, and a data storage system may use blocks of different sizes for storing different types of data and/or metadata.

The volume-file mapping 228 maps each file representing a data object to a respective internal volume. Higher levels of the IO stack 140 can then access the internal volume using block-based semantics. The volume-file mapping can be achieved in a variety of ways. According to one example, a file representing a data object is regarded as a range of blocks, and the range of blocks can be expressed as a corresponding range of offsets into the file. Because volumes are accessed based on starting location (logical unit number) and offsets into the volume, the volume-file mapping 228 can establish a one-to-one correspondence between offsets into the file and offsets into the corresponding internal volume, thereby providing the requisite mapping needed to express the file in the form of a volume.

The object-volume mapping layer 224 maps internal volumes to respective data objects accessible to hosts, such as LUNs, host file systems, and VVols, for example. For LUNs, object-volume mapping may involve a simple remapping from a format compatible with the internal volume to a format compatible with the LUN. In some examples, no remapping is needed. For host file systems, object-volume mapping may be accomplished in part by leveraging from the fact that file systems are customarily built upon volumes, such that an underlying volume is part of the structure of any host file system. Host file systems, also called "upper-deck file systems," are thus built upon the internal volumes presented by the volume-file mapping 228 to provide hosts with access to files and directories. Mapping of VVols can be achieved in similar ways. For block-based VVols, the object-volume mapping layer 224 may perform mapping substantially as it does for LUNs. For file-based vVOLs, the object-volume mapping layer 224 may perform mapping by converting host-specified offsets into VVol files to corresponding offsets into internal volumes.

The protocol end points 220 expose the underlying data objects to hosts in accordance with respective protocols for accessing the data objects. Thus, the protocol end points 220 may expose block-based objects (e.g., LUNs and block-based VVols) using Fiber Channel or iSCSI and may expose file-based objects (e.g., host file systems and file-based VVols) using NFS, CIFS, or SMB 3.0, for example.

Figure 3:
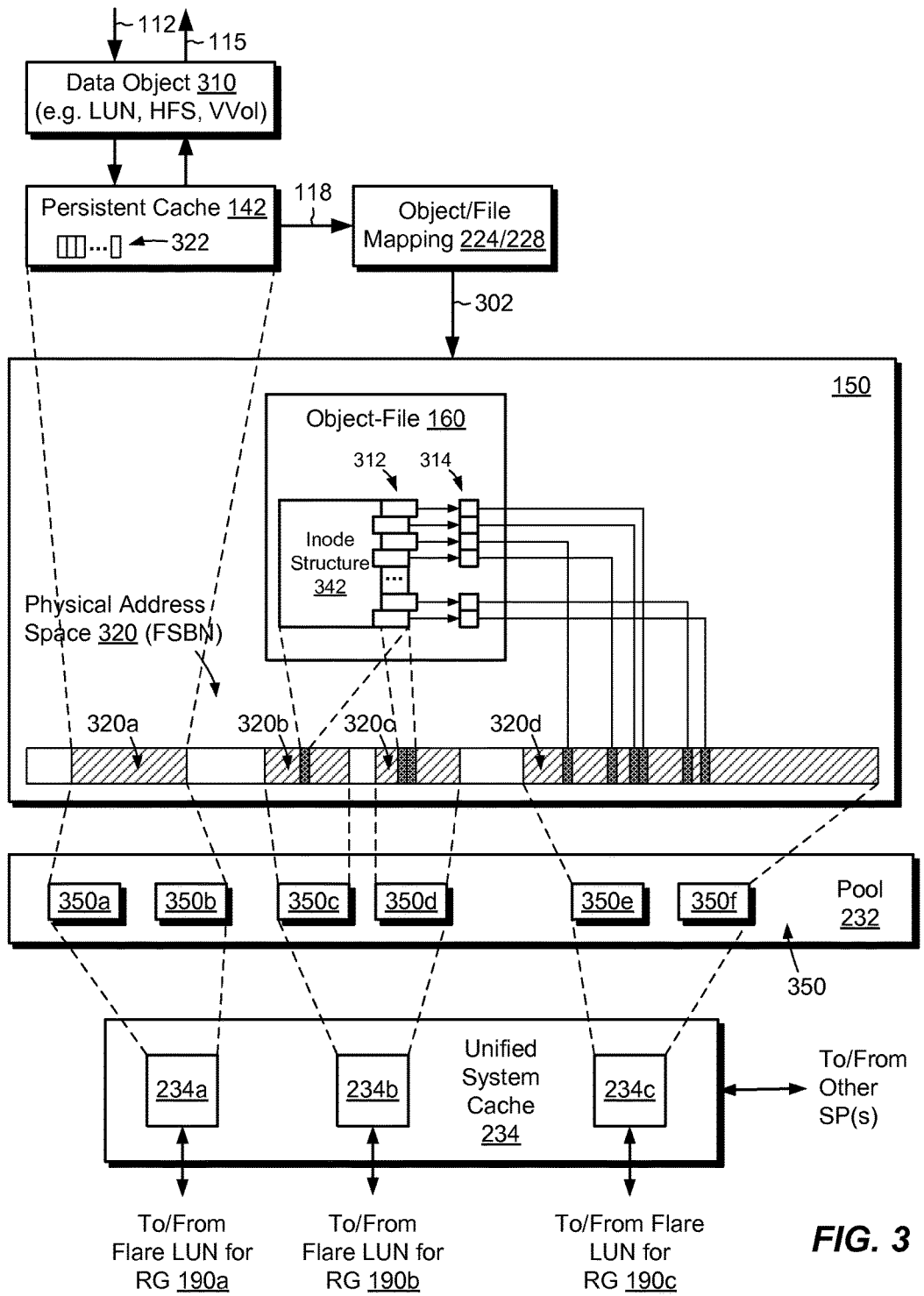
FIG. 3 is a block diagram showing example features of the IO stack of FIG. 2 in further detail, including a file system containing an object-file having a logical address space mapped to data blocks at non-contiguous physical addresses.

FIG. 3 shows portions of the front end 142 in additional detail. Here, a data object 310 represents a host-accessible object, such as a LUN, a host file system (HFS), or a VVol, for example. Persistent cache 142 stores data specified in IO requests 112 (i.e., data 322) to be written to the data object 310. Object-file mapping 224/228 (object-volume mapping 224 plus volume-file mapping 228—see FIG. 2) converts the IO requests 112, which specify writes to the data object 310, into mapped IO requests 302 directed to the underlying object-file 160. As shown, the object-file 160 is a file within file system 150 (a lower-deck file system). The object-file 160 has an inode structure 342 that stores information about the object-file 160. The inode structure 342 includes an inode itself (from an inode table of the file system 150) as well as any indirect blocks needed to address the logical address space 162 (FIG. 1) of the object-file 160.

File system 150 is seen to have a physical address space 320, which may be indexed, for example, by FSBN (file system block number), where FSBN ranges from zero to some large number. In the example shown, the physical address space 320 has various subspaces, shown here with references 320a to 320d, which are supported by respective sets of slices 350 served from the storage pool 232. For example, subspace 320a is reserved for the persistent cache 142 and is backed by slices 350a and 350b. Subspace 320b is reserved for inodes and is backed by slice 350c. Subspace 320c is reserved for indirect blocks (IBs) and is backed by slice 350d, and subspace 320d is reserved for file data and is backed by slices 350e and 350f. Although each subspace is seen to be backed by an illustrated number of slices, it is understood that each subspace may be backed by any number of slices. The example shown is merely illustrative.

As indicated above, slices 350 are derived from Flare LUNs, which are expressions of respective RAID groups. In an example, the unified system cache 234 supports the underlying Flare LUNs for reads and writes, and includes multiple logical segments (234a, 234b, and 234c), e.g., one segment for each Flare LUN. In an example, cache segment 234a supports the Flare LUN for RAID group 190a, which provides slices 350a to 350b. Similarly, cache segment 234b supports the Flare LUN for RAID group 190b, which provides slices 350c and 350d, and cache segment 234c supports the Flare LUN for RAID group 190c, which provides slices 350e to 350f.

The unified system cache 234 supports the persistent cache 142, such that the persistent cache 142 operates as an extension of the unified system cache 234. The unified system cache 234, like the persistent cache 142 of which it is a part, may be implemented using battery-backed DRAM, which is mirrored to battery-backed DRAM on the SP 120a (or on multiple other SPs).

To process IO requests 112, the persistent cache 142 receives the IO requests 112 and caches their data 322, e.g., via the subspace 320a and into the segment 234a of the unified system cache 234. During the flush operation 118, which may occur after many IO requests 112 have been cached, the file system 150 receives the accumulated data 322 in multiple mapped IO requests 302. The mapped IO requests 302 specify data 322 to be written to multiple logical addresses of the object-file 160.

The inode structure 342 in FIG. 3 shows the state of the object-file 160 prior to any remapping by the L-P mapping manager 152. Here, the inode structure 342 includes block pointers 312 that point to data blocks 314 storing data of the object-file 160. The data blocks 314, which are logical structures in the depiction of FIG. 3, are stored at the physical addresses in the physical address space 320 indicated by the connecting lines. In this example, the block pointers 312 illustrated are those covering the logical addresses to which the mapped IO requests 302 are directed. Thus, the block pointers 312 should not be regarded as being necessarily contiguous or as covering any particular logical address range. Rather, they may reflect logical addresses of data specified in mapped IO requests 302 in the order the file system 150 receives them. It can also be seen that the block pointers 312 point to physical addresses in no particular pattern. Rather, the mapping between block pointers 312 and physical addresses may be arbitrary or even random. The blocks 314 are therefore likely to reside on different slices 350 and certainly on different stripes of underlying RAID groups. Thus, in this initial situation, no full-stripe writes are likely to be achieved with the block pointers 312 mapped as they appear.

In some examples, the IO stack 140 may perform additional steps to organize data for writing by aggregating writes directed to contiguous logical addresses. For example, separate and apart from the other mapping and/or remapping actions described herein, the IO stack 140 may identify writes to adjacent logical addresses of the object-file 160. Rather than separately flushing data to the file system 150 for each logical address one at a time, the IO stack 140 may instead perform one flushing operation for multiple adjacent logical addresses. This aggregation of adjacent writes helps to further improve efficiency.

Figure 4:
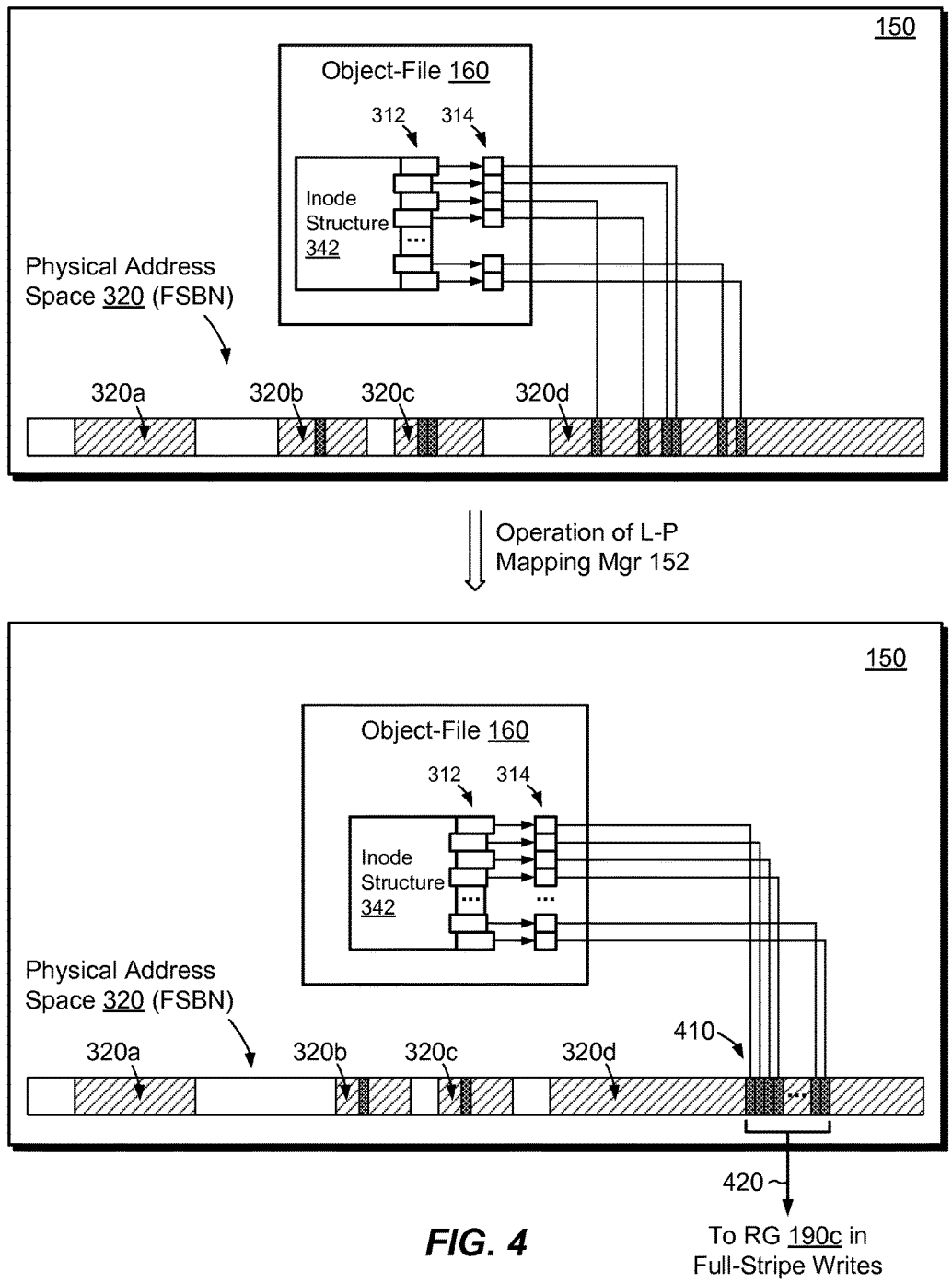
FIG. 4 is a block diagram showing the example file system of FIG. 3 before and after remapping logical addresses of the object-file to data blocks at contiguous physical addresses, to support one or more full-stripe writes to any of the RAID groups shown in FIG. 1.

FIG. 4 shows an example arrangement in which the L-P mapping manager 152 remaps the blocks specified in IO requests 302 to a contiguous range of physical addresses (e.g., a window) for promoting a full-stripe write. The depiction of the file system 150 in the top part of the figure is the same as that shown in FIG. 3, but the bottom of FIG. 4 shows the remapped blocks after operation of the L-P mapping manager 152. Here, it is seen that the file system 150 has allocated contiguous free blocks from a window 410 of contiguous physical addresses 410. The file system 150 has copied the contents of the blocks 314 from their previous locations to the window 410 and has updated the block pointers 312 to point to the new physical addresses. The file system 150 has thus remapped the logical addresses specified in the mapped IO requests 302 to the window 410. Rather than the logical addresses mapping to data blocks at arbitrary physical addresses, as shown at the top of FIG. 4, the logical addresses instead map to data blocks at contiguous physical addresses. The window 410 of physical addresses has a size that corresponds to an integer number of full stripes, such that flushing the blocks in the window 410 to lower levels of the IO stack 140 (e.g., via flushing operation 420) induces one or more full-stripe writes. It should be understood that the relative size of the window 410 and the blocks shown within it are not necessarily to scale. For example, the window 410 may include any number of blocks corresponding to an integer number of full stripes.

To provide a particular example, if a RAID stripe has five segments (as shown in FIG. 1), of which four are data and one is parity, and if each segment is 64 KB in size, then the size of a full stripe is 256 KB (4*64 KB). Accordingly, the file system 150 establishes the window 410 to be the same size (e.g., 256 KB), or an integer multiple thereof. Assuming 8-KB block size, the window 410 thus includes 32 blocks (256 KB/8 KB). To write the data in the window 410 to a full stripe 196 on a RAID group, the IO stack 140 writes 8 blocks (64 KB) from the window 410 to each data segment 192 of the RAID stripe 196. The IO stack 140 also computes parity and writes 64 KB of parity to the parity segment 194 on the RAID stripe 196.

Although the examples shown in FIGS. 3 and 4 relate to overwrites, i.e., to circumstances in which blocks being written to are already mapped to physical addresses, the L-P mapping manager 152 may also be used for allocating writes, i.e., to circumstances in which blocks being written to are not yet mapped to any physical addresses.

Figure 5:
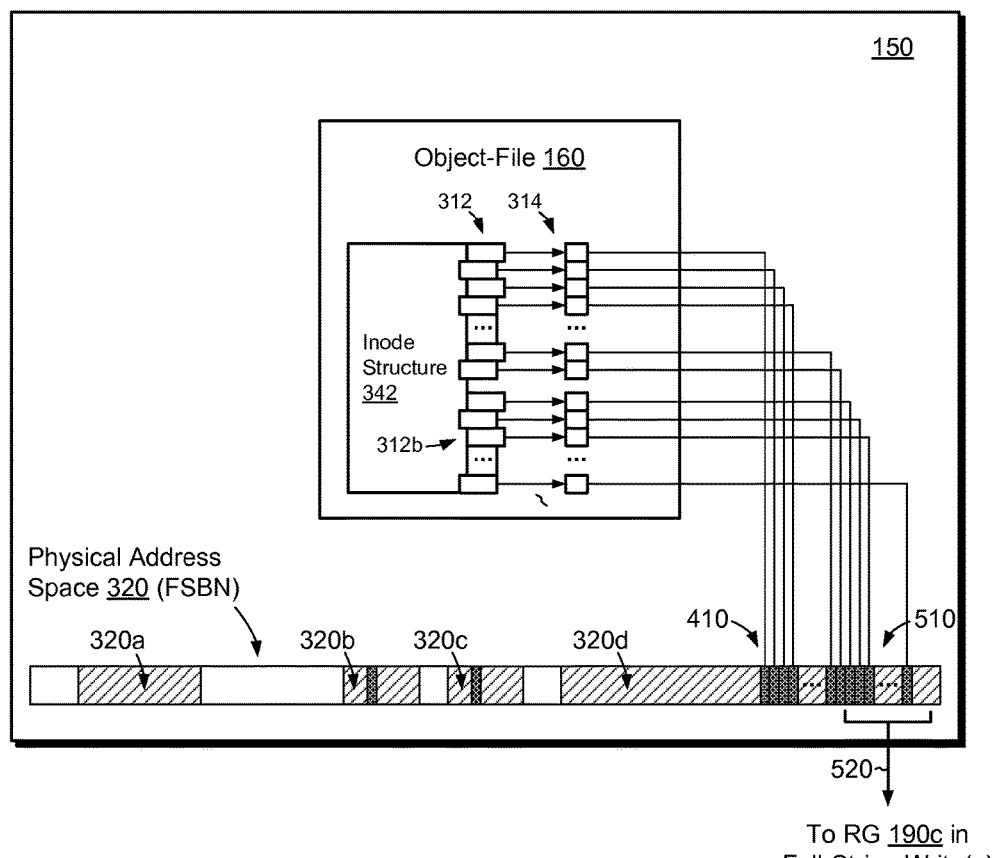
FIG. 5 is a block diagram showing the example file system of FIG. 3 after receiving an IO request that enlarges the logical address space of the object-file.

FIG. 5 shows an example arrangement in which the L-P mapping manager 152 operates for mapping allocating writes. This arrangement may arise in response to the data storage system 116 receiving additional IO requests 112 specifying new data to be written to the data object 310. To accommodate the allocating writes, the L-P mapping manager 152 directs the file system 150 to add new block pointers 312b to the inode structure 342, to enlarge the logical address space 162 of the object-file 160 and to provide block pointers for newly added data blocks. The L-P mapping manager 152 may then direct the file system 150 to allocate a new range of contiguous free blocks 312b at a contiguous range of physical addresses 510, i.e., another window. The L-P mapping manager 152 directs the file system 150 to set the new block pointers 312b to point to the newly allocated blocks 312b in the window 510, and to write the data specified in the new IO requests 112 to the newly-allocated blocks 312b. The window 510 of physical addresses has a size that corresponds to an integer number of full stripes, such that flushing the blocks in the window 510 to lower levels of the IO stack 140 (via flushing operation 520) induces one or more full-stripe writes.

Section II: Example Embodiments for Creating Free Space

The previous section described a process for performing full-stripe writes by mapping or remapping diverse logical offsets of an object-file to a range of contiguous blocks in a physical address space of a file system. This section describes a technique for promoting the above process by creating ranges of contiguous free blocks in the file system. The technique described in this section thus allows a data storage system more fully to realize the benefits of performing full-stripe writes to improve efficiency and disk utilization.

Referring briefly back to FIG. 1, it is seen that the memory 130 of the SP 120 includes a space maker 154. The space maker 154 creates ranges of contiguous free space in the file system 150 by relocating allocated blocks within target ranges to other locations within the file system 150. In an example, each range of free space created by the space maker 154 has a length equal to an integer multiple of full stripes. For example, if each stripe of a RAID group has a capacity of 256 KB (excluding parity), then the length of each range of free space created by the space maker 154 is an integer multiple of 256 KB, such as 256 KB, 512 KB, 768 KB, and so on. If the file system 150 uses a block size of 8 KB, then each range of free space would be an integer multiple of 32 blocks (256 KB/8 KB per block), such as 32 blocks, 64 blocks, 96 blocks, and so forth. It should be understood that the length of RAID stripes and the size of blocks can vary, so these values for range size are merely illustrative.

Figure 6:
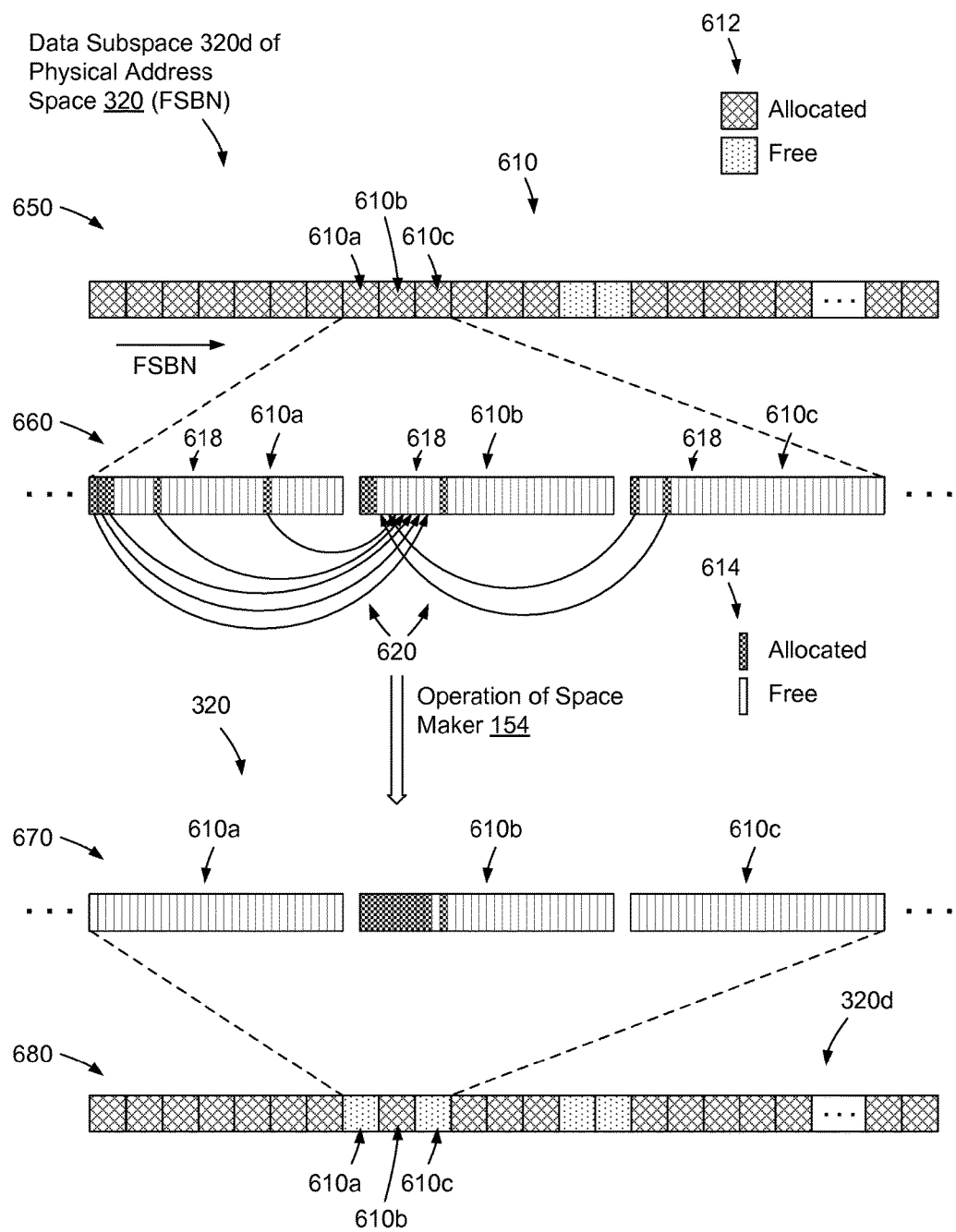
FIG. 6 is a diagram showing multiple allocation windows in a physical address space of a file system before and after relocating allocated blocks.

FIG. 6 shows example aspects of the file system 150 in additional detail. As seen in view 650, the data subspace 320d of physical address space 320 (FIGS. 3-5) includes multiple ranges 610 of contiguous blocks, also referred to herein as "windows." In an example, the windows 610 are uniformly sized and cover unique ranges of increasing FSBN, with no window 610 overlapping with any other window 610. The data subspace 320d can thus be regarded as being divided into windows 610, with the windows 610 provided at predetermined intervals. Although not required, each window 610 may have a window number (not shown), which indicates an ordinal position of the window 610 within the physical address space 320 of the file system 150. While the windows 610 in FIG. 6 are shown in the data subspace 320d, it should be understood that the use of windows 610 need not be limited to the data subspace 320d. Rather, windows may be employed in other subspaces, such as those shown in FIGS. 3-5. Also, although the windows 610 in this example are uniformly sized, this is merely an example, as windows 610 may be provided in different sizes, e.g., to correspond to different integer multiples of a full stripe and/or to different stripe sizes. For instance, the file system 150 may be supported by multiple RAID groups having different sized stripes, and windows 610 backed by different RAID groups may be of different size. Further, although the windows 610 in this example are adjacent to one another, this is also merely an example, as windows 610 may be arranged within the physical address space 320 in any suitable way.

As indicated with reference to legend 612, each window 610 is either allocated or free. A window 610 is allocated if any of the blocks within its range of FSBNs are allocated. A window 610 is free only if none of the blocks within its range of FSBNs are allocated. View 650 specifically points out three windows, 610a, 610b, and 610c. It can be seen that all three windows 610a, 610b, and 610c are allocated, meaning that at least one block in each of these windows is allocated.

Expanded view 660 reveals that each window 610 contains 32 blocks 618. Other implementations may provide other numbers of blocks per window. As indicated with reference to legend 614, window 610a has five allocated blocks, window 610b has three allocated blocks, and window 610c has two allocated blocks. These allocated blocks may belong to the object-file 160 or to some other file(s) or structure(s) in the file system 150. The rest of the blocks in windows 610a, 610b, and 610c are free.

It is evident that blocks 618 within the windows 610a, 610b, and 610c are sparsely allocated. Sparse allocation of blocks within windows 610 may be a common occurrence in file systems using certain allocation schemes and may contribute to the file system 150 running short on free windows 610. The space maker 154 may thus serve an especially crucial role of creating free windows when used in connection with these sparse allocation schemes.

As shown with arrows 620, the space maker 154 performs block relocation operations to create free space in windows 610a and 610c. For example, the space maker 154 identifies allocated blocks in each of the windows 610a and 610c. For each allocated block ("source" block), the space maker 154 directs the file system 150 to perform the following actions:

1. Allocate a free block ("target" block) in another window 610 or location; here, target blocks are found in the window 610b.
2. Copy the contents (e.g., file data) of the source block to the newly allocated target block.
3. Update any and all block pointers in the file system 150 pointing to the source block (e.g., in inode structures, such as 342—FIG. 3) such that the block pointers point to the target block instead of pointing to the source block.

4. Update metadata of the file system to designate the source block as free.
5. Update metadata of the file system to designate the target block as allocated.

The file system 150 performs these actions at the direction of the space maker 154 in any suitable order and for each allocated block in the windows 610a and 610c.

Expanded view 670 shows the windows 610a, 610b, and 610c after operation of the space maker 154. It is seen that all allocated blocks in windows 610a and 610c have been relocated to window 610b and that all blocks in windows 610a and 610c are now free. View 680 shows that the windows 610a and 610c themselves are now free. Thus, operation of the space maker 154 has created two new free windows 610, which may serve as locations for arranging data for performing full-stripe writes, e.g., using the technique described in Section I.

Figure 7:
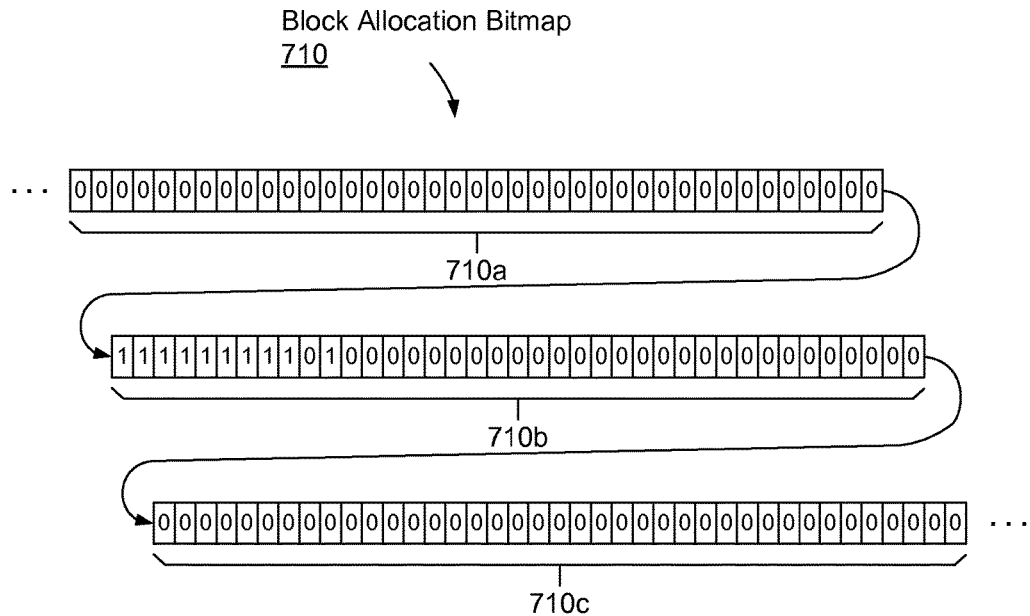
FIG. 7 is a diagram showing an example block allocation bitmap for keeping track of allocated blocks and windows.

FIG. 7 shows example metadata that the file system 150 may employ in tracking the allocation status of blocks 618 in the windows 610 and thus to assist in tracking the allocation status of windows 610. Here, a block allocation bitmap 710 includes consecutive bits that indicate the allocation status of consecutive blocks in the physical address space 320. Each bit of the block allocation bitmap 710 corresponds to a respective FSBN in the file system 150. In this example, a "1" in a bit position of the block allocation bitmap 710 indicates that the block 618 at the corresponding FSBN is allocated, whereas a "0" indicates that the block is free.

The block allocation bitmap 710 may be arranged in groups of bit positions, where each group tracks the allocation status of blocks within a respective window 610. For example, groups 710a, 710b, and 710c track the allocation status of blocks 618 within the windows 610a, 610b, and 610c, respectively. From the bitmap 710, the allocation status of entire windows 610 can be determined, e.g., by computing whether all the bits in each group are zero. It is thus seen from the example of FIG. 7 that windows 610a and 610c are free, as indicated by the bits in groups 710a and 710c all equaling zero, but that window 610b is allocated, as indicated by some of the bits in group 710b equaling one.

Figure 8:
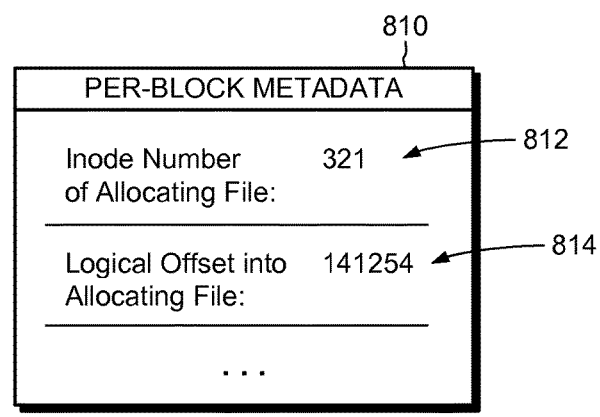
FIG. 8 is a diagram showing example per-block metadata.

FIG. 8 shows example per-block metadata 810 of the file system 150. In an example, each block 618 has respective per-block metadata 810. The per-block metadata 810 provides metadata specific to each block 618, and includes, for example, (i) an inode number 812 that uniquely identifies the file to which the block 618 was allocated in the file system 150 and (ii) a logical offset 814 into the file designated by the inode number 812 at which the block 618 was allocated. By inspecting the per-block metadata 810 across multiple blocks 618 in a window 610, it can be determined whether the blocks 618 in that window correspond to contiguous logical offsets (addresses) within the same file. As will be described, the space maker 154 can make beneficial use of per-block metadata 810 in determining whether or not it should act to free a given window 610.

Figure 9:
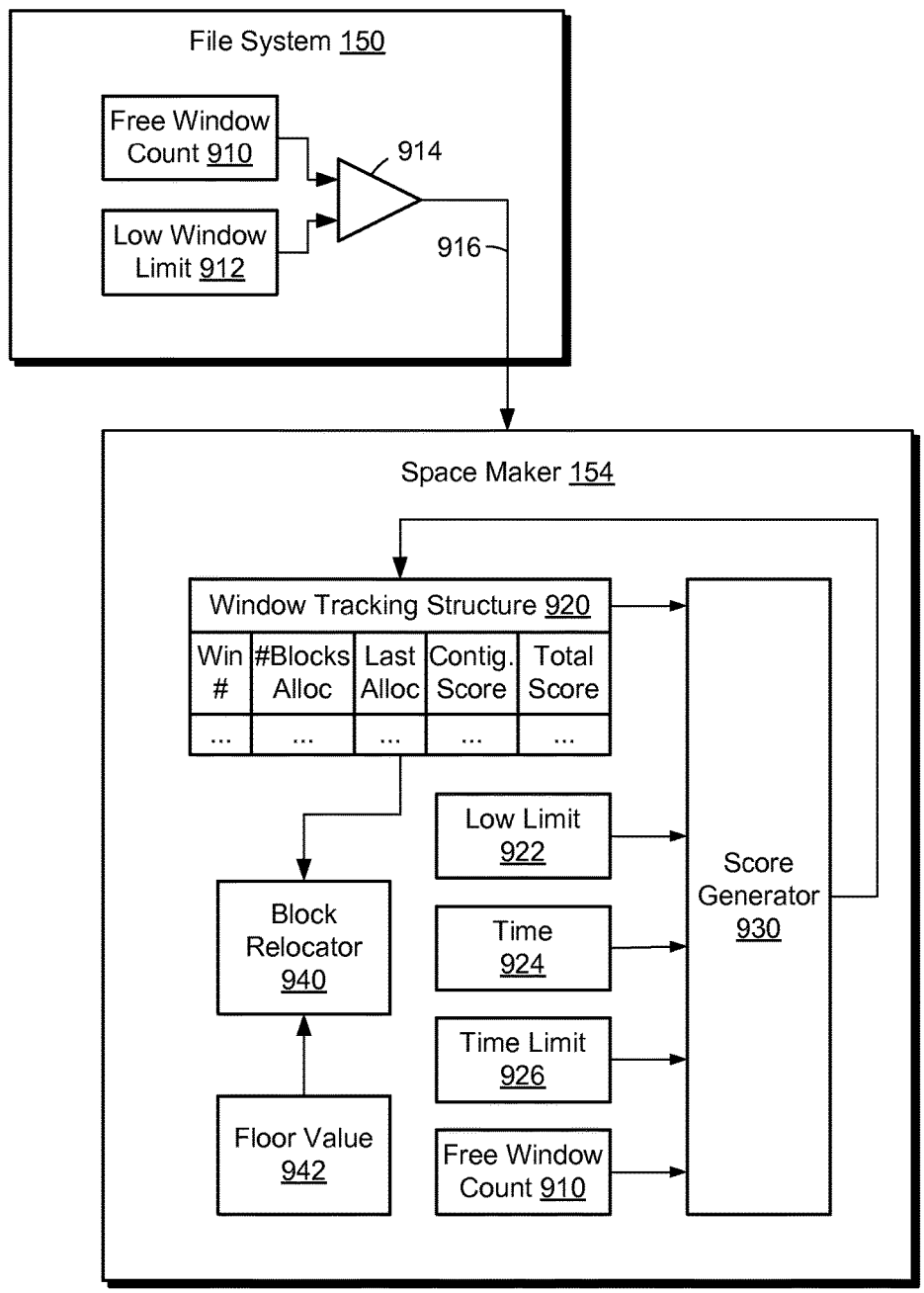
FIG. 9 is a block diagram showing an example space maker of FIG. 1 in additional detail.

FIG. 9 shows example features of the file system 150 and the space maker 154 in additional detail. Here, a small subset of features of the file system 150 is seen to include a free window counter 910, a low window limit 912, and a comparison operator 914. The space maker 154 is seen to include a window tracking structure 920, a score generator 930, a block relocator 940, and multiple data elements 922, 924, 926, and 910.

In an example, the window tracking structure 920 maintains a list of characteristics of particular windows 610, with each window designated by a window number ("Win #"). These characteristics may include the following:

Blocks Alloc. The number of blocks 618 within the window that have been allocated.

Last Alloc. The last time a block 618 was allocated to the window.

Contig. Score. A machine-generated score based on the extent to which any allocated blocks within the respective window correspond to contiguous logical offsets within a file.

Total Score: A machine-generated score based on the above characteristics.

It should be understood that the window tracking structure 920 may list different characteristics from the ones shown and may contain a greater or fewer number of window characteristics. In some examples, the space maker 194 may rank windows 610 based on a single characteristic, such as the number of blocks allocated, such that no total score is required. In other examples, no ranking of windows is performed. Instead, the space maker 154 iterates through allocated windows 610 and makes a decision for each one whether to free the window 610 or to leave it alone.

The data elements 922, 924, 926, and 910 provide input to the score generator 930, which may use the data elements in generating total scores for windows 610 listed in the window tracking structure 920. The data elements are described as follows:

Low Limit 922. A number of allocated blocks within any window 610 below which the window 610 is considered to be a good candidate for freeing.

Time 924. The current time, e.g., as measured by an internal system clock.

Time limit 926. A maximum period of time. If no blocks have been allocated to a window 610 for a period of time that exceeds the time limit 926, then the window 610 is considered to be a good candidate for freeing.

Free Window Count 910. The total number of free windows in the file system 150.

In some examples, the low limit 922 and the time limit 926 are adjustable parameters, which may be established or varied by administrators, users, or applications, to tune performance.

In example operation, the space maker 154 populates the window tracking structure 920, e.g., in response to the file system 150 being mounted or some other event. To obtain the "#Blocks Alloc" for each window 610, the space maker 154 may access the block allocation bitmap 710 (FIG. 7) and count the number of allocated blocks within a group of bits for the respective window. To obtain the "Last Alloc" for each window 610, the space maker 154 may refer to a timestamp in a file system log, for example. To obtain the "Contig. Score" for each window 610, the space maker 154 may scan the per-block metadata 810 (FIG. 8) of the allocated blocks in the respective window, noting whether the per-block metadata 810 refer to the same inode number 812 and, if so, whether the per-block metadata 810 refer to logical offsets 814 that form a contiguous range in the same file. The space maker 154 assigns a low "Contig. Score" to windows covering fully contiguous ranges of logical offsets into the same file, assigns higher scores to windows covering partially contiguous ranges, and assigns high scores to windows covering fully non-contiguous ranges or to blocks allocated to different files. A high value of "Contig. Score" for a window 610 thus indicates that the window may be a good candidate for freeing.

In general, windows that are good candidates to be freed are (1) those to which only a small number of blocks have been allocated, (2) those for which no new blocks have been allocated for a long time, and/or (3) those which contain blocks that belong to multiple files and/or to disparate logical offsets within files. In the first case, windows containing small numbers of blocks waste space, so freeing the windows provides an opportunity to utilize space more efficiently, e.g., for full-stripe writing. In the second case, windows to which no new blocks have been recently allocated may be cold, such that freeing them may have little detrimental effect on performance in comparison to the advantages gained. In the third case, windows containing blocks mapped from different files and/or to disparate file locations are fragmented, such that freeing the windows will make fragmentation no worse and may even reduce fragmentation.

In an example, the space maker 154 invokes the score generator 930 to generate a total score for each window 610 listed in the window tracking structure 920. The total score for each window may be based on the window's #Blocks Alloc, Last Alloc, and Contig. Score, as well as on the data elements 922, 924, 926, and 910. The space maker 154 may refresh the window tracking structure 920 and data elements, e.g., on a regular basis, continually, or on demand, to ensure that they reflect current information at the times they are acted upon. The score generator 930 may operate based on a weighted sum, combinatorial logic, fuzzy logic, a neural net, a machine learning algorithm, or any machine-based scoring process based on multiple inputs.

As the file system 150 operates, e.g., to service IO requests 112 from hosts (FIG. 1), the file system 150 may regularly test whether the total number of free windows 610 in the file system 150 has fallen below a predetermined limit. This action is shown graphically at the top of FIG. 9, in which comparison operator 914 compares the free window count 910 with the low window limit 912. In an example, when the free window count 910 falls below the low window limit 912, the comparison operator 914 issues a command 916 to invoke the space maker 154 to create new free windows 610.

Upon receiving the command 916, the space maker 154 activates the block relocator 940. In response, the block relocator 940 begins freeing windows 610, e.g., in the manner described in connection with FIG. 6. In an example, the block relocator 940 frees windows 610 in order of total score, beginning with the highest scoring window listed in the window tracking structure 920 and proceeding to lower scoring windows. In some examples, the space maker 154 specifies a floor value 942 on the total score. Thus, for example, if the total score for a window 610 falls below the floor value 942, the space maker 154 leaves the window 610 alone and does not attempt to free it. The floor value 942 thus prevents the space maker 154 from freeing windows 610 that are already well-suited for performing full-stripe writes and/or that are otherwise well utilized already.

Although not shown, the space maker 154 may also perform operations to select windows 610 to use as targets for block relocation, i.e., windows in which to place relocated blocks. In an example, the space maker 154 selects a target window as one of the windows listed in the window tracking structure 920, e.g., as one that has a high total score. Thus, for example, windows 610 that are good candidates to be target windows are the same ones that are good candidates to be source windows. This is merely an example, however, as target windows may be selected in any suitable way. Given the sparse allocation of many source windows, it is expected that a relatively large number of source windows can be freed at the cost of consuming a relatively small number of target windows.

The space maker 154 may be implemented in a variety of ways and is not limited to the particular embodiment shown. For instance, the space maker 154 may be instantiated multiple times, with each instance directed to a particular portion of the file system 150. In a particular example, a different instance of the space maker 154 is provided for each slice 350 in the data space 320d of the file system 150 (FIG. 3). Each instance of the space maker 154 operates in the context of its respective slice, with its window tracking structure 920 listing only windows 610 within the respective slice. In this example, no instance of the space maker 154 may have an overall, global view of the file system 150; rather, each instance may operate independently within its own limited space.

A simple implementation of the space maker 154 may dispense with the window tracking structure 920 altogether and operate in a greedy fashion on a per-window basis, e.g., by iterating through windows 610 individually and determining whether to perform block relocation one window at a time, without any ranking or consideration of other windows 610 besides the current source window and target window.

Figure 10:
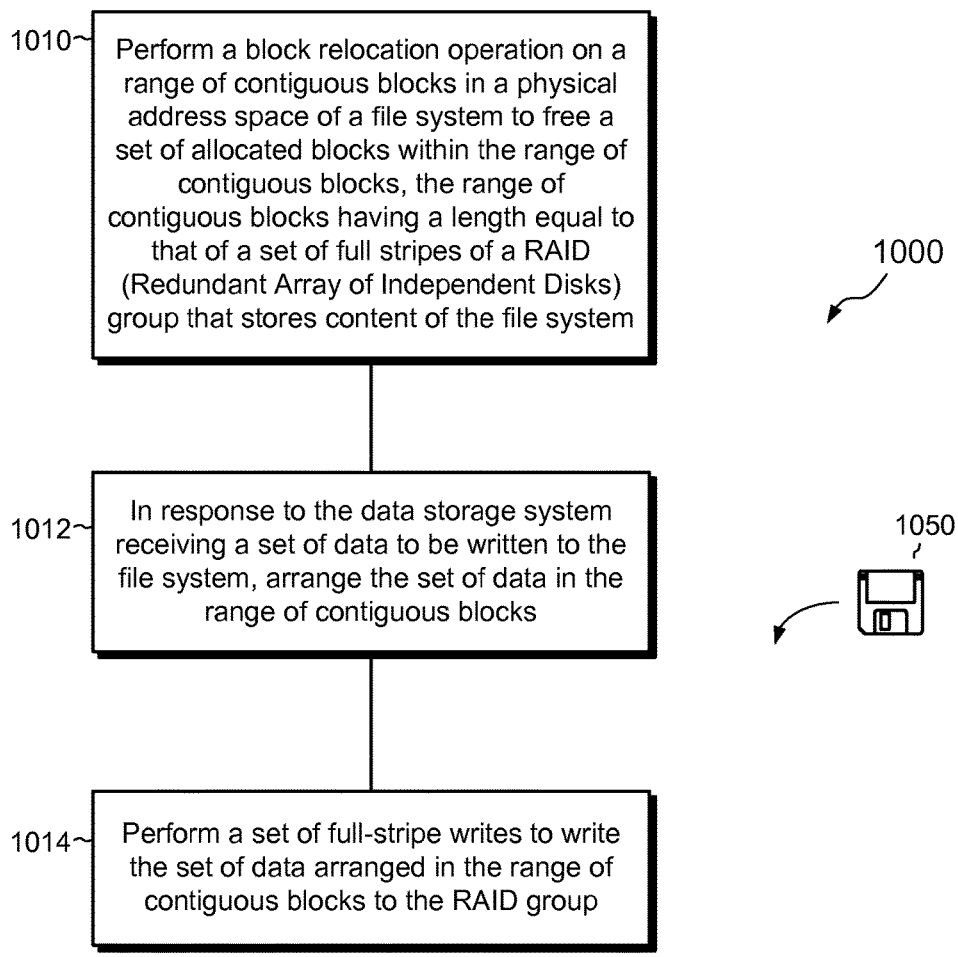
FIG. 10 is a block diagram showing an example process for managing data storage in a data storage system.

FIG. 10 shows an example process 1000 for managing data storage in a data storage system and provides a summary of some of the material presented above. The process 1000 may be performed by the software constructs described in connection with FIGS. 1-9, which reside in the memory 130 of the storage processor 120 and are run by the set of processing units 124.

At 1010, a block relocation operation is performed on a range of contiguous blocks in a physical address space of a file system to free a set of allocated blocks within the range of contiguous blocks, the range of contiguous blocks having a length equal to that of a set of full stripes of a RAID group that stores content of the file system. For example, as shown in FIG. 6, the space maker 154 performs block relocation on a window 610a of contiguous blocks to free a set of allocated blocks (five shown) in the window 610a. The window 610 has a length of 640 KB (32 blocks times 8 KB per block), which corresponds to the length of a full stripe of a RAID group (e.g., RAID group 190c).

At 1012, in response to the data storage system receiving a set of data to be written to the file system, the set of data are arranged in the range of contiguous blocks. For example, as shown in FIG. 4, blocks directed to diverse logical offsets of the object-file 160 are mapped to a window 410 of contiguous blocks in the physical address space 320 of the file system 150. The window 410 of contiguous blocks may correspond to a window that was freed by the space maker 154.

At 1014, a set of full-stripe writes is performed to write the set of data arranged in the range of contiguous blocks to the RAID group. For example, as shown in FIG. 4, the data arranged in the window 410 may be flushed, via flushing operation 420, to the RAID group 190c for performing one or more full-stripe writes.

An improved technique has been described for managing data storage in a data storage system. The improved technique creates free space in a file system as needed and as resources allow to support full-stripe writes of newly arriving data. The potential of full-stripe writing for improving disk utilization can thus be more fully realized.

Having described certain embodiments, numerous alternative embodiments or variations can be made. For example, although embodiments have been described writing one or more full stripes of data at a time, there is no requirement that stripes be completely filled with data. Thus, for example, full-stripe writes can include less data than that required to fill the stripes completely.

Further, although it has been described that the space maker 154 creates free windows to lay the groundwork for performing full-stripe writes, performing full-stripe writes is not the only reason to create free space using the space maker 154. For example, another reason may be to promote mapping or remapping of contiguous logical addresses (offsets) to contiguous physical addresses in the file system 150. Thus, for example, the space maker 154 may create free windows 610 so that the file system 150 may fill those windows 610 with data from contiguous logical addresses of a file. The space maker 154 may thus be used as part of a process for reducing file fragmentation. As an added benefit, windows filled with data from contiguous logical addresses may be written to an underlying RAID group using full-stripe writes.

Further, although the above-described technique for creating free windows has been described in connection with lower-deck file systems, this is merely an example, as the techniques described could be applied to file systems at any level and of any type.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 1050 in FIG. 10). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a second event may take place before or after a first event, or even if no first event ever occurs. In addition, an identification herein of a particular element, feature, or act as being a "first" such element, feature, or act should not be construed as requiring that there must also be a "second" or other such element, feature or act. Rather, the "first" item may be the only one. Although certain embodiments are disclosed herein, it is understood that these are provided by way of example only and that the invention is not limited to these particular embodiments.

Those skilled in the art will therefore understand that various changes in form and detail may be made to the embodiments disclosed herein without departing from the scope of the invention.

What is claimed is:

1. A method of managing data storage in a data storage system, the method comprising:
   performing a block relocation operation on a range of contiguous blocks in a physical address space of a file system to free a set of allocated blocks within the range of contiguous blocks, the range of contiguous blocks having a length equal to that of a set of full stripes of a RAID (Redundant Array of Independent Disks) group that stores content of the file system;
   in response to the data storage system receiving a set of data to be written to the file system, arranging the set of data in the range of contiguous blocks; and
   performing a set of full-stripe writes to write the set of data arranged in the range of contiguous blocks to the RAID group,
   wherein the range of contiguous blocks is one of multiple ranges of contiguous blocks logically represented in the physical address space of the file system, and wherein the method further comprises tracking free ranges in the file system, each free range being a respective one of the ranges of contiguous blocks, for which no blocks are allocated,
   wherein the range of contiguous blocks is one of multiple ranges of contiguous blocks in the physical address space of the file system, and wherein the method further comprises:
      generating, for each of the multiple ranges of contiguous blocks, a contiguousness score that indicates a degree to which blocks within the respective range of contiguous blocks store contiguous file data;
      ranking the multiple ranges of contiguous blocks based at least in part on the contiguousness score; and
      selecting a highest-ranking range of contiguous blocks for block relocation to free all allocated blocks in the selected range.

2. The method of claim 1, wherein generating the contiguousness score for a particular range of contiguous blocks includes:
   scanning per-block metadata of allocated blocks in the particular range;
   detecting, by scanning the per-block metadata, that the allocated blocks in the particular range have been allocated to a common file; and
   establishing a value of the contiguousness score based on an extent to which the per-block metadata indicate that the allocated blocks in the particular range have contiguous logical offsets within the common file.

3. The method of claim 1, wherein the multiple ranges of contiguous blocks are all equal in length, and wherein tracking the free ranges includes maintaining a bitmap, the bitmap indicating, for each block in the multiple ranges of contiguous blocks, whether the block is allocated or free.

4. The method of claim 3, wherein the block relocation operation is initiated in response to detecting that a number of free ranges in the file system has fallen below a predetermined limit.

5. The method of claim 3, further comprising performing another block relocation operation on another of the ranges of contiguous blocks, to free a set of allocated blocks within the other range of contiguous blocks, in response to a number of allocated blocks in the other range of contiguous blocks being below a predetermined limit.

6. The method of claim 3, further comprising performing another block relocation operation on another of the ranges of contiguous blocks, to free a set of allocated blocks within the other range of contiguous blocks, in response to no blocks in the other range of contiguous blocks having been allocated within a predetermined period of time.

7. The method of claim 3, further comprising:
storing, for each block within the ranges of contiguous blocks, metadata that identifies (i) a file in the file system to which the block was allocated and (ii) a logical offset into the file at which the block was allocated, and
performing another block relocation operation on another of the ranges of contiguous blocks, to free a set of allocated blocks within the other range of contiguous blocks, in response to the other range of contiguous blocks not corresponding to a range of contiguous logical offsets into any file, as indicated by the metadata for the blocks in the other range of contiguous blocks.

8. The method of claim 3, further comprising:
ranking the ranges of contiguous blocks according to a set of factors to produce a ranked list of ranges of contiguous blocks, the set of factors including a number of allocated blocks within each of the ranges of contiguous blocks; and
performing a block relocation operation on a higher ranking range of contiguous blocks before performing a block relocation operation on a lower ranking range of contiguous blocks.

9. The method of claim 3, further comprising:
performing a block relocation operation on a second range of contiguous blocks in the physical address space of the file system to free a set of allocated blocks within the second range of contiguous blocks, the second range of contiguous blocks having a length equal to that of the set of full stripes of the RAID group;
in response to the data storage system receiving data to be written to contiguous logical offsets into a file of the file system, arranging the data in the range of contiguous blocks in order of logical offset; and
performing a set of full-stripe writes to write the data arranged in the range of contiguous blocks to the RAID group.

10. A data storage system, comprising control circuitry that includes a set of processing units coupled to memory, the control circuitry constructed and arranged to:
perform a block relocation operation on a range of contiguous blocks in a physical address space of a file system to free a set of allocated blocks within the range of contiguous blocks, the range of contiguous blocks having a length equal to that of a set of full stripes of a RAID (Redundant Array of Independent Disks) group that stores content of the file system;
in response to the data storage system receiving a set of data to be written to the file system, arrange the set of data in the range of contiguous blocks; and
perform a set of full-stripe writes to write the set of data arranged in the range of contiguous blocks to the RAID group,
wherein the range of contiguous blocks is one of multiple ranges of contiguous blocks in the physical address space of the file system, and wherein the control circuitry is further constructed and arranged to:
generate, for each of the multiple ranges of contiguous blocks, a contiguousness score that indicates a degree to which blocks within the respective range of contiguous blocks store contiguous file data;
rank the multiple ranges of contiguous blocks based at least in part on the contiguousness score; and
select a highest-ranking range of contiguous blocks for block relocation to free all allocated blocks in the selected range.

11. The data storage system of claim 10,
wherein the range of contiguous blocks is one of multiple ranges of contiguous blocks logically represented in the physical address space of the file system,
wherein the multiple ranges of contiguous blocks are all equal in length, and
wherein the control circuitry is further constructed and arranged to initiate the block relocation operation in response to detecting that a number of free ranges in the file system has fallen below a predetermined limit, each free range being a respective one of multiple the ranges of contiguous blocks, for which no blocks are allocated.

12. The data storage system of claim 11, wherein the control circuitry is further constructed and arranged to:
store, for each block within the ranges of contiguous blocks, metadata that identifies (i) a file in the file system to which the block was allocated and (ii) a logical offset into the file at which the block was allocated; and
perform another block relocation operation on another of the ranges of contiguous blocks, to free a set of allocated blocks within the other range of contiguous blocks, in response to at least one of:
(i) a number of allocated blocks in the other range of contiguous blocks being below a predetermined limit,
(ii) no blocks in the other range of contiguous blocks having been allocated within a predetermined period of time, and
(iii) the other range of contiguous blocks not corresponding to a range of contiguous logical offsets into any file, as indicated by the metadata for the blocks in the other range of contiguous blocks.

13. The data storage system of claim 12, wherein the control circuitry is further constructed and arranged to:
perform a block relocation operation on a second range of contiguous blocks in the physical address space of the file system to free a set of allocated blocks within the second range of contiguous blocks, the second range of contiguous blocks having a length equal to that of the set of full stripes of the RAID group;
in response to the data storage system receiving data to be written to contiguous logical offsets into a file of the file system, arrange the data in the range of contiguous blocks in order of logical offset; and
perform a set of full-stripe writes to write the data arranged in the range of contiguous blocks to the RAID group.

14. A computer program product including a set of non-transitory, computer-readable media having instructions which, when executed by a set of processing units of a data storage system, cause the set of processing units to perform a method for managing data storage, the method comprising:
performing a block relocation operation on a range of contiguous blocks in a physical address space of a file system to free a set of allocated blocks within the range of contiguous blocks, the range of contiguous blocks having a length equal to that of a set of full stripes of a RAID (Redundant Array of Independent Disks) group that stores content of the file system;

in response to the data storage system receiving a set of data to be written to the file system, arranging the set of data in the range of contiguous blocks; and performing a set of full-stripe writes to write the set of data arranged in the range of contiguous blocks to the RAID group, wherein the range of contiguous blocks is one of multiple ranges of contiguous blocks in the physical address space of the file system, and wherein the method further comprises:

generating for each of the multiple ranges of contiguous blocks, a contiguousness score that indicates a degree to which blocks within the respective range of contiguous blocks store contiguous file data;

ranking the multiple ranges of contiguous blocks based at least in part on the contiguousness score; and selecting a highest-ranking range of contiguous blocks for block relocation to free all allocated blocks in the selected range.

15. The computer program product of claim 14, wherein the range of contiguous blocks is one of multiple ranges of contiguous blocks logically represented in the physical address space of the file system, wherein the multiple ranges of contiguous blocks are all equal in length, and wherein the block relocation operation is initiated in response to detecting that a number of free ranges in the file system has fallen below a predetermined limit, each free range being a respective one of multiple the ranges of contiguous blocks, for which no blocks are allocated.

16. The computer program product of claim 15, wherein the method further comprises performing another block relocation operation on another of the ranges of contiguous blocks, to free a set of allocated blocks within the other range of contiguous blocks, in response to a number of allocated blocks in the other range of contiguous blocks being below a predetermined limit.

17. The computer program product of claim 15, wherein the method further comprises performing another block relocation operation on another of the ranges of contiguous blocks, to free a set of allocated blocks within the other range of contiguous blocks, in response to no blocks in the other range of contiguous blocks having been allocated within a predetermined period of time.

18. The computer program product of claim 15, wherein the method further comprises:

storing, for each block within the ranges of contiguous blocks, metadata that identifies (i) a file in the file system to which the block was allocated and (ii) a logical offset into the file at which the block was allocated, and performing another block relocation operation on another of the ranges of contiguous blocks, to free a set of allocated blocks within the other range of contiguous blocks, in response to the other range of contiguous blocks not corresponding to a range of contiguous logical offsets into any file, as indicated by the metadata for the blocks in the other range of contiguous blocks.

19. The computer program product of claim 15, wherein the method further comprises:

ranking the ranges of contiguous blocks according to a set of factors to produce a ranked list of ranges of contiguous blocks, the set of factors including a number of allocated blocks within each of the ranges of contiguous blocks; and performing a block relocation operation on a higher ranking range of contiguous blocks before performing a block relocation operation on a lower ranking range of contiguous blocks.

20. The computer program product of claim 15, wherein the method further comprises:

performing a block relocation operation on a second range of contiguous blocks in the physical address space of the file system to free a set of allocated blocks within the second range of contiguous blocks, the second range of contiguous blocks having a length equal to that of the set of full stripes of the RAID group;

in response to the data storage system receiving data to be written to contiguous logical offsets into a file of the file system, arranging the data in the range of contiguous blocks in order of logical offset; and performing a set of full-stripe writes to write the data arranged in the range of contiguous blocks to the RAID group.

* * * * *